(No Model.)
R. F. CROSSE.
REVERSIBLE WIRE BROILER.
No. 306,063. Patented Oct. 7, 1884.
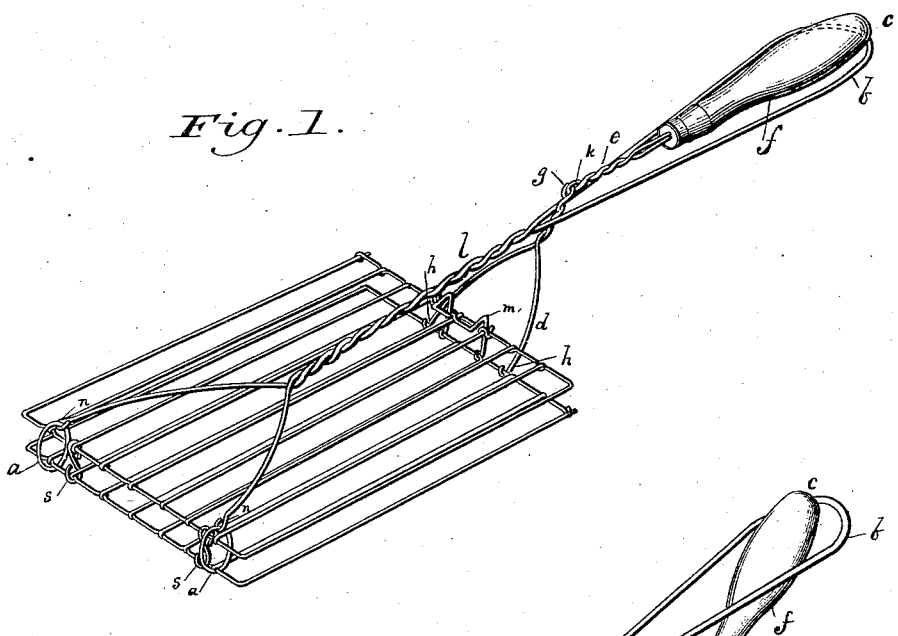
Fig. 1.
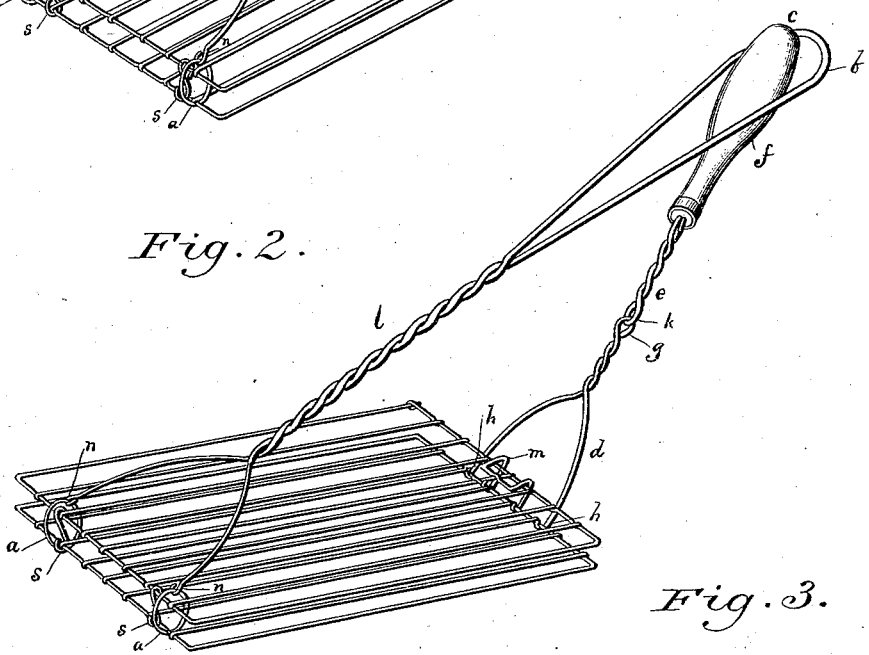
Fig. 2.
Fig. 3.
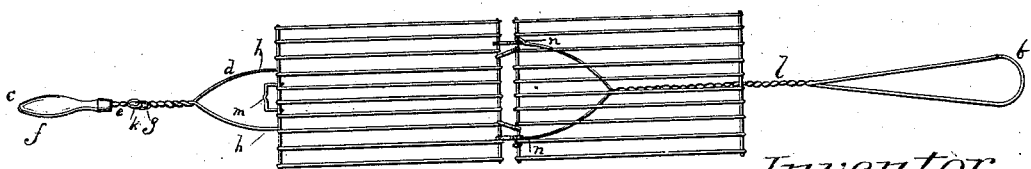
Witnesses:
L. B. Perry.
A. C. Schenck.
Inventor:
Romanzo F. Crosse
by his attorney
Geo. M. Barry

UNITED STATES PATENT OFFICE.

ROMANZO F. CROSSE, OF BOSTON, MASSACHUSETTS.

REVERSIBLE WIRE BROILER.

SPECIFICATION forming part of Letters Patent No. 306,063, dated October 7, 1884.

Application filed February 13, 1884. (No model.)

*To all whom it may concern:*

Be it known that I, ROMANZO F. CROSSE, of Boston, in the county of Suffolk and Commonwealth of Massachusetts, have invented a new and useful Improvement in Reversible Wire Broilers, of which the following description, together with the accompanying drawings, is a specification.

The object of my invention is (stated briefly and in general) the production of a reversible wire broiler which will broil meat more evenly and thoroughly than it can be done at present.

Figure 1 shows the broiler and the relative position of the handles as they would appear if a person using the broiler were sitting in front of a fire about as high as his chair-seat. Fig. 2 shows the relative position of the handles and how they adjust themselves with relation to each other if the fire is in a lower position, the handles in both figures and positions governing the broiler, so that it is perfectly flat and horizontal above the fire. Fig. 3 is a detail view showing the broiler opened out at full length.

I take as a basis for my invention an ordinary wire broiler without handles, fastened by S-hooks *s* at one end, as usual, and at the other by a wire clamper, *m*, or other device.

The improvement consists in handles and their adjustment, by means of which the broiler is made not only reversible, so that the meat can be broiled on both sides, but the broiler, while held in the hand, can be kept perfectly level and horizontal above the fire, and all parts of the under side of the meat will be equally near to the fire.

In an ordinary broiler held in the hand it is practically impossible to broil a steak evenly throughout, because, on account of its straight stiff handles, as it is thrust out over the fire, one end of the broiler will naturally be nearer the fire than the other, and the meat will be burned dry at one end and nearly raw at the other; but by means of this invention both ends of the broiler will naturally be on a level with each other; consequently all parts of the under surface of the meat will be equidistant from the fire, and will necessarily be cooked alike and evenly.

For ordinary cooking purposes, where the broiler is held in the hand, this is a blessing to the housewife, and for use in camp, where the broiler must be held over an improvised fire, it is invaluable. Two rings, *a*, not necessarily endless, are run through the ends of the broiler-frame near the S-hooks, thus together with said S-hooks connecting both sides of the frame. The ends *u* of the handle *b* are hooked into these rings. This handle *b* is formed of a stout piece of wire twisted together at the middle, *l*, and the ends spreading out like a crook where joined to the rings. The handle spreads out into an oval-shaped opening at the part which is held in the hand, in order to accommodate the other handle, *c*, which it partly incloses when in use, as shown; or the wire may run straight from the rings to the hand, and then turn in the loop-like way shown without being twisted in the center at all. It may assume any fanciful shape desired, the material point being that the wire shall be spread apart at the hand to accommodate the other handle, *c*, as aforesaid. The handle *c* is always the under handle. It is made of two pieces of stout wire, *d* and *e*, and a holding-piece, *f*. The piece *d* is twisted to form the ring or loop *g*, and its ends *h* are hooked to the opposite end of the broiler from that to which the ends of the handle *b* are fastened. The piece *e* is twisted as shown, to form the ring or loop *k*, and its ends are thrust into and firmly held in the holding-piece *f*, and both rings *g* and *k* engage with each other. The holding-piece *f* is of wood and neatly turned, but may be of iron or any other suitable material. If both handles are taken together in the hand and the broiler is held over a fire as high as an ordinary range, while one is supposed to be seated in front of it, the handles will occupy the relative positions shown in Fig. 1. If the fire is somewhat lower than that, the handle *c* can be allowed to drop, as shown in Fig. 2, so as to keep the broiler perfectly level and horizontal. Those two figures are designed to illustrate the point that the handle *c* can be used to raise or depress the rear end of the broiler—that is, the end nearest to the hand—so that all parts of the under side of the broiler are always equally distant from the fire, and consequently the meat will broil evenly.

What I claim as new, and desire to secure by Letters Patent, is—

1. A broiler composed of two gratings hinged together at one end, a handle secured thereto only at and by the hinges, and a supplemental handle hinged to the free end of one of the gratings, substantially as and for the purpose described.

2. The combination, with the hinged gratings, of a handle pivoted to the hinges and otherwise unattached to the broiler, and a supplemental handle pivoted to the free end of one of the gratings and jointed between its ends, substantially as and for the purpose set forth.

3. The gratings hinged together and adapted to receive and hold an article to be broiled, combined with a handle connected with them only at their hinged end, and by which said gratings may be suspended or placed in desired position, and a supplemental jointed handle hinged or pivoted to the free end of one of such gratings, and adapted to govern the position of the gratings with respect to the other handle, as set forth.

ROMANZO F. CROSSE.

Witnesses:
GEO. M. BARRY,
A. C. SCHENCK.